United States Patent [19]

Lewis

[11] Patent Number: 5,194,567

[45] Date of Patent: Mar. 16, 1993

[54] REACTION INJECTION MOLDABLE (RIM) THERMOSET POLYIMIDE ELASTOMERS

[75] Inventor: Charles M. Lewis, Springfield, Mo.

[73] Assignee: Dayco Products, Inc., Dayton, Ohio

[21] Appl. No.: 681,741

[22] Filed: Apr. 8, 1991

[51] Int. Cl.$^5$ .................... C08G 73/10; C08F 222/40
[52] U.S. Cl. ............................... 528/170; 526/262; 528/220; 528/229; 528/321; 528/322; 528/367; 564/442
[58] Field of Search ............... 528/170, 220, 229, 321, 528/322, 367, 392; 526/262, 283; 564/442

[56] References Cited

U.S. PATENT DOCUMENTS

| | | | |
|---|---|---|---|
| 2,818,405 | 12/1957 | Kovacic | 528/322 |
| 3,658,764 | 4/1972 | Bargain et al. | 528/322 |
| 3,741,942 | 6/1973 | Crivello | 528/321 |
| 4,845,181 | 7/1989 | Kool et al. | 528/48 |
| 4,959,444 | 9/1990 | Lewis | 528/170 |
| 4,983,705 | 1/1991 | Lewis et al. | 528/170 |

Primary Examiner—John Kight, III
Assistant Examiner—Shelley A. Wright
Attorney, Agent, or Firm—Joseph V. Tassone

[57] ABSTRACT

A prepolymer of the formula

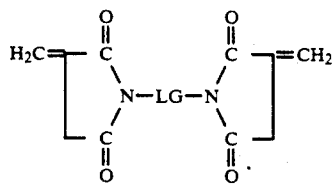

where LG is a linking group, and copolymers thereof; polymers prepared therefrom, and a reaction injection molding process employing the same.

11 Claims, No Drawings

REACTION INJECTION MOLDABLE (RIM) THERMOSET POLYIMIDE ELASTOMERS

BACKGROUND OF THE INVENTION

The present invention relates to temperature resistant thermoset plastic polyimide elastomers and more particularly to thermally stable thermoset plastic polyimide elastomers useful in automotive power transmission belts which are reaction injection molded.

The temperature requirements for engine accessory drive belts have increased so dramatically that conventional elastomers, used to fabricate power transmission belts, are not adequate for tomorrow's automobiles.

The obvious solution would be to incorporate new fabricating technology and materials into a totally new method of manufacture for power transmission belts. This is what led us to RIM processing, short for Reaction Injection Molding. This is not to be confused with the Injection Molding process which is widely used today to make thermoplastic molded parts. The Thermoplastic Injection Molding machine simply melts the plastic and injects it into a cold mold where it hardens and assumes the desired shape of the mold. These plastics can be processed over and over again by remelting, and injecting them into new molds.

The RIM machine meters two chemically reactive liquids, commonly designated as "A" and "B" reactants, in a precise volumetric ratio to a impingement mixer at near sonic velocity. The reacting liquid chemicals are then injected into a low pressure mold before they have had sufficient time to polymerize into a solid plastic. The resulting polymer is a fully crosslinked thermoset plastic of enormous molecular weight that can never be reprocessed again, it will thermally degrade before remelting.

The key to the process is in the word "REACTION", i.e., (Chemical Reaction). The polymer is polymerized, created insitu, in the mold by the spontaneous chemical reaction of two liquid oligomer systems with each other. I use the term oligomer system because neither the A or B side is a completely finished polymer. The A and B components are blended chemical intermediates which are liquid and have no chemical reactive to themselves at the processing temperature. The two oligomer intermediates do, however, react very with each other upon mixing. Typical reaction times of 0.2 to 1 second are not uncommon. Finished, completely cured parts are commonly molded in 1 to 2 minutes.

Polymer technology has not kept pace with RIM technology. There a number of RIM polyurea and polyurethane materials which satisfy the basic physical characteristics required in these applications, namely, tensile strength, flexural modulus, hardness, and elongation. In addition, they have superior dynamic properties over conventional millable gum elastomers such as Neoprene, Hycar. and Hypalon. They do not, however, have the temperature resistance necessary for automotive power transmission belts.

Thermal degradation studies conducted on these elastomers clearly show the thermally weak part to be the urethane or urea linkage. The polymer backbone structures are capable of withstanding much higher temperatures. The polythioether backbones are stable to about 600° F., aliphatic polyethers are stable to about 670° F., and aromatic polyethers are stable at temperatures in excess of 700° F. Oligomeric diamines used to formulate polyureas would satisfy all the requirements for power transmission belts if a more heat resistant chemical linkage could be found. It would also satisfy all of the manufacturing requirements if the new chemical linkage would form insitu by RIM processing. In accordance with the present invention, these oligomeric prepolymers are terminated by a maleimide, itaconimide, citraconimide, triazolinedione, or vinylketone and the conventional linkages of the polyurethane or polyurea have been replaced by a much more stable linkage formed by Michael Addition or Diels Alder reaction with these moieties.

Polymers formed by Michael (nucleophilic) Addition of a bismaleimide or itaconimide are known in the art. White, J.E. et al., "Reactions of Diaminoalkanes with Bismaleimides: Synthesis of Some Unusual polyimides," J. Appl. Poly Sci., 29, 891-99 (1984) discloses that polyimide elastomers can be obtained by reacting diaminoalkanes having flexible backbones with aliphatic and aromatic bismaleimides. Examples of the diaminoalkanes are 1,8-diaminoctane, N,N-dimethyl-1,6-hexanediamine.

I have discovered that these also hold true with the bisitaconimides. In fact I have found that the bisitaconimides behave and perform identically to the bismaleimides, and the resulting 3-methylsuccinimide linkage is much more stable than the succinimide linkage formed by the bismaleimides.

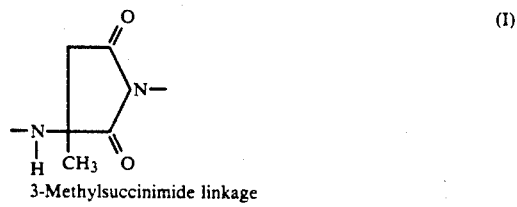
3-Methylsuccinimide linkage (I)

Succinimide linkage (II)

This is due to the location of the double bismaleimide, the bond is located in the ring, and the linkage resulting from the Michael Addition to a primary amine leaves a tertiary hydrogen attached to the succinimide ring. The itaconimide on the other hand has its unsaturated bond between a pendant methyl group and the succinimide ring. On reacting with a primary amine the amine is directed to attach directly to the succinimide ring leaving a pendant methyl group rather than a tertiary hydrogen. The pendant methyl group is far more thermally stable than a tertiary hydrogen and it adds flexibility and resilience to the polymer.

U.S. Pat. No. 3,741,942 to Crivello (1973) teaches a polyimide obtained by reaction of a bismaleimide and a dithiol, however, these polyimides, while temperature resistant, do not have the other physical properties required for use in automotive power transmission belts and there is no disclosure of RIM processing of the polyimides.

Bismaleimides have also been used to crosslink unsaturated rubbers as described in U.S. Pat. No. 2,989,504 to Little (1961), and they have been reacted with diamines by Michael Addition in making fibers and molded articles as described in U.S. Pat. No. 2,818,405 to Kovacic (1957), U.S. Pat. No. 3,658,764 to Lyon (1972). U.S. Pat. No. 3,767,626 to Bron (1973), and U.S. Pat. No. 3,878,172 to Bargain et al. (1975), and RE 29,316 to Bargain et al. (1976).

U.S. Pat. No. 3,738,967 to Crivello (1973) teaches that polyimides can also be prepared by a nucleophilic addition reaction of a bismaleimide and hydrogen sulfide. These polyimides are disclosed as being useful in molding, insulation, and coating. Another class of polyimide is obtained by reacting a bismaleimide with a diamine and then a sulfide or dithiol according to U.S. Pat. No. 3,766,138 to Crivello (1973).

SUMMARY OF THE INVENTION

A principal object of the present invention is to provide a thermally stable elastomer having the requisite performance characteristics for use in power transmission belts.

Another subject of the present invention is to provide a thermally stable elastomer which can be prepared and molded by reaction injection molding.

A further object of the present invention is to provide liquid oligomers with bismaleimide, bisitaconimide, biscitraconimide, bistriazolinedione, or bisvinylketone terminations which are useful in reaction injection molding to provide thermally stable elastomeric articles.

A still further object of the present invention is to provide thermally stable power transmission belts which are prepared using the elastomers described herein.

Another object of the present invention is to provide a reaction injection moldable bismaleimide, bisitaconimide, biscitraconimide, bistriazolinedione, or bisvinylketone oligomeric prepolymer.

Another object of the present invention is to provide a process for reaction injection molding wherein the bismaleimide, biscitraconimide, bisitaconimide, bistriazolinedione, or bisvinylketone terminated prepolymers described herein are reacted with a dinucleophile to prepare articles of the temperature resistant elastomers described herein.

These and other objects are achieved in the present invention which provides:

A polyimide having one of the following repeating units in the formula.

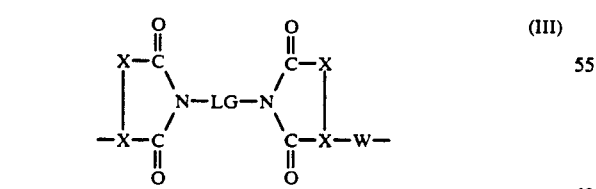

(III)

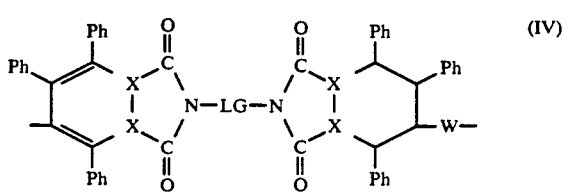

(IV)

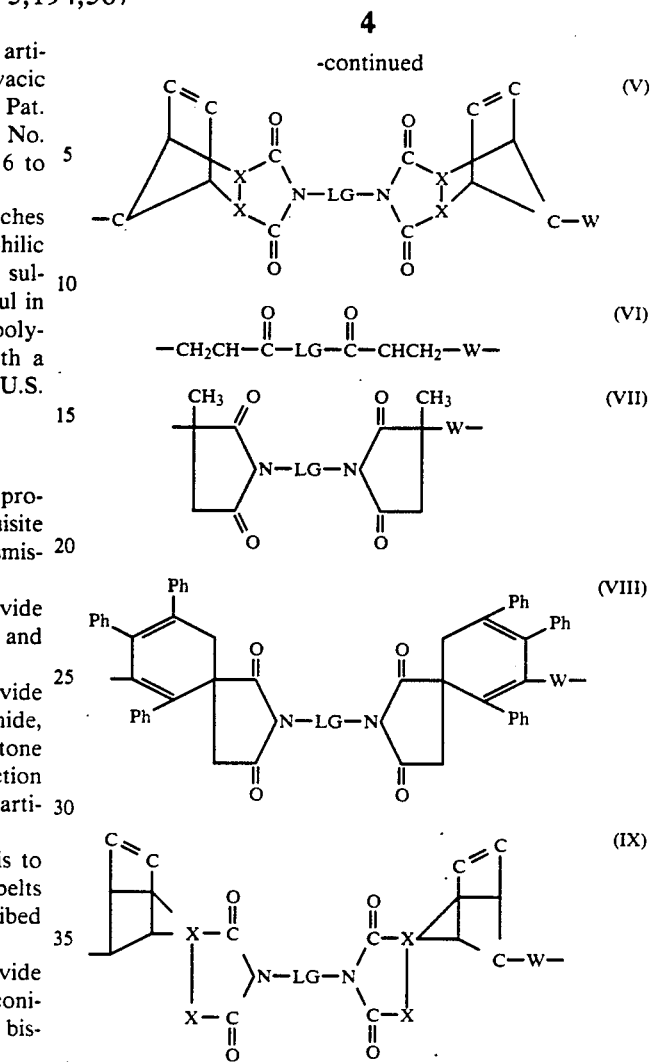

where

W is a member having in its backbone a chain selected from the group consisting of a polyether, polythioether, polyetherthioether, polycarbonyl, or a copolymer thereof; and more particularly

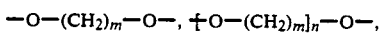

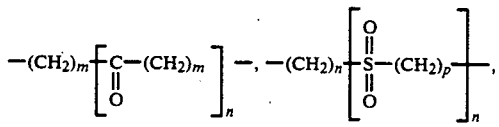

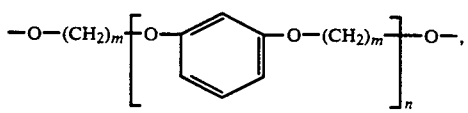

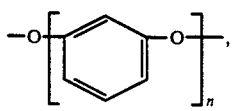

x is a carbon or nitrogen atom and when x is a carbon atom, one carbon atom may be substituted by a methyl group;

m is 1 to 13 and preferably 4 to 13;
n is 1 to 5;
Where LG is a linking group and preferably a group of the formula:

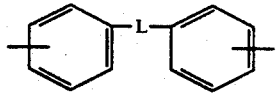

Where L represents a flexible linking group and more particularly a group having one of the following structures:

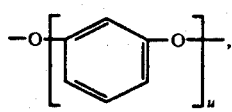

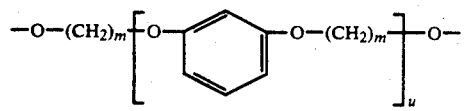

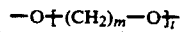

Where u is 1 to 7 and preferably 1,3, or 7; t is 1 to 5 and preferably 1 or 3.; m is 1 to 13 preferable 4 to 13;

L may also represent an alkylene bridge of 1 to 5 carbon atoms such as methylene, ethylene, etc.; or L may be represented by the following formulas:

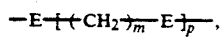

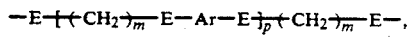

and more particularly

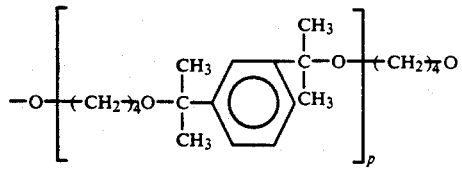

where E is —O—,

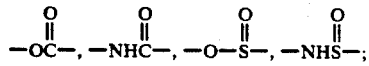

m is defined as above, p is 3 or 5; and Ar represents an arylene including alkarylene such as phenylene and bis isopropylenephenylene.

The linking group LG and L are usually divalent, however, trivalent and tetravalent linking groups such as

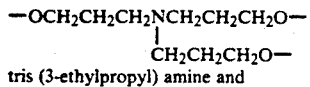
tris (3-ethylpropyl) amine and

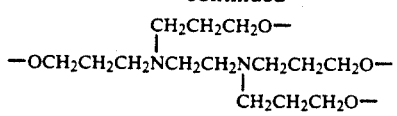

N,N,N',N', -tetrakis(3-etherpropyl)ethylenedamine are also possible. When the linking group is trivalent or tetravalent, the A component may contain 3 or 4 bismaleimide, bisitaconimide or like groups. It is doubtful that the latter linking groups would be used since it would be more expedient to introduce crosslinking into the polymer by using a polyvalent dinucleophile.

W represents a oligomer of between 500 and 6,000 in molecular weight. It can be an aliphatic polyether, polythioether, polyetherthioether, or a poly-metaphenylether. W may also represent a co-polymer of two or more of these moieties. When W is a branched chain moiety, there may be 2 to 4 reactive terminal groups.

A bismaleimide, bisitaconimide, biscitraconimide, bistriazolinedione, and bisvinylketone terminated oligomeric prepolymer with one of the following formula.

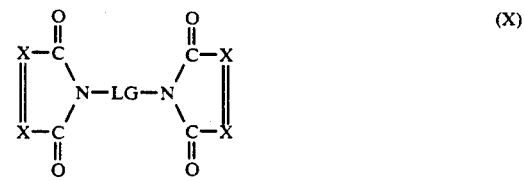
(X)

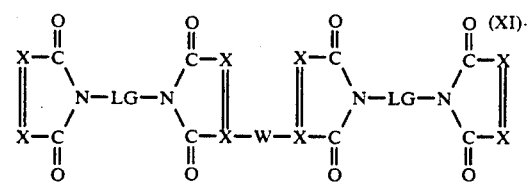
(XI)

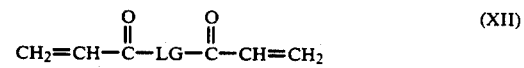
(XII)

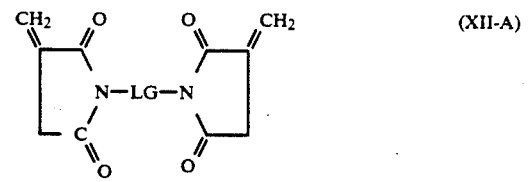
(XII-A)

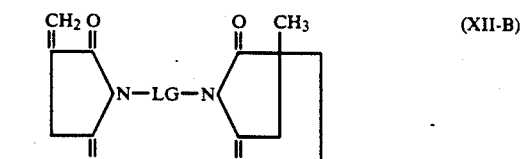
(XII-B)

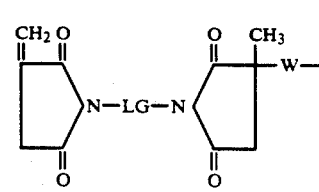

-continued

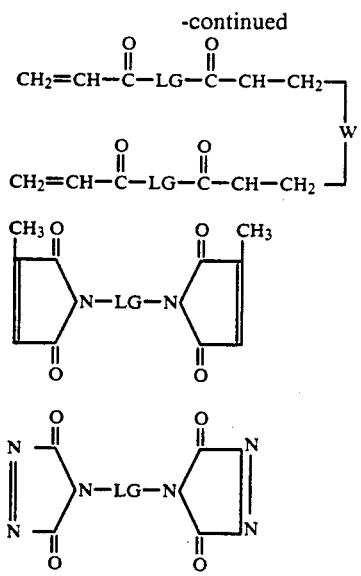

A temperature resistant elastomer prepared by reacting a bismaleimide, bisitaconimide, biscitraconimide, bistriazolinedione, or bisvinylketone terminated prepolymer of the formulas (X)-(XIV) with a dinucleophile in a Michael Addition or a Diels Alder Addition polymerization.

DETAILED DESCRIPTION OF THE INVENTION

Temperature resistant elastomeric polyimides in accordance with the present invention are prepared by reacting any of the prepolymers of formulas (X), (XII), (XII-A), (XIII) or (XIV) above with a dinucleophile in a Michael Addition or Diels.Alder reaction.

A particular advantage of the present invention is that the prepolymers of the formulas (X), (XII), (XII-A), (XIII) or (XIV) are useful in reaction injection molding. Hereinafter, the prepolymers of the formulas (X), (XII), (XII-A), (XIII) or (XIV) will be referred to as the "A component" and the dinucleophile will be referred to as the "B component".

In (RIM), it is essential that both the A and B components be a low viscosity liquid at the process temperature, preferable no greater than 10,000 centipoise at 110° C. There stoichiometric ratios must be reasonably close, no greater than 3 to 1, preferable 1.5 to 1. The A and B components must be low enough in molecular weight, preferable between 600 and 5,000, to impart sufficient molecular mobility to permit complete polymerization in 60 seconds, preferably in 10 to 20 seconds.

All of these factors are important. If one or more of these parameters are out of range the following may result:

1. Too slow on reaction time, premature reaction shutdown, or sticky product, most likely the molecular weights of both the A and B components are too great.

2. Sticky, gelatinous soup, is generally the result of improper stoichiometric rations.

3. Fully cured parts with veins of sticky material mixed throughout or hard and soft areas in the same part, is most like caused by poor mixing. This can occur when the stoichiometric ratios are too far apart of if there is a great difference between the viscosities of the A and B components.

In accordance with the present invention, two approaches have been adopted with respect to the design of component A. Formula (X) represents bismaleimides, XII-A represents bisitaconimides, XIII represents biscitraconimides and XIV represents bistriazolinediones which are liquid under the RIM reaction conditions. Due to the symmetry of these compounds, there is a tendency for the compounds to be crystalline solids. In accordance with the present invention, however, the compounds are designed with a flexible linking group L between the maleimide moieties which places a sufficient internuclear distance between the rings and provides sufficient flexibility to the molecule that the compounds are liquid under the RIM reaction conditions.

In order to provide sufficient flexibility and internuclear distance in prepolymers of the formula (V), L is preferably an aromatic ether group, an aliphatic ether group or aromatic ether groups alternating with short aliphatic chains. The aliphatic chains between ether linkages preferably having 4 to 13 carbon atoms. The aromatic ether preferably includes a meta substituted phenylene as opposed to a para or ortho substituted phenylene because meta substitution provides substantially lower melting points in the A component and much greater flexibility to the linking group.

PROCEDURE: A solution containing 1.0 mole equivalent of an aromatic primary diamine terminated aliphatic ether oligomer, in dry acetone was added drop wise to a mechanically stirred solution of dry acetone and 2.0 moles of itaconic anhydride at 12° C. After the addition step has been completed, the solution is allowed to warm to 27° C. and is continuously stirred for an additional 4 hours. A cream off-white precipitate will form and the reactor solution will become very thick.

To the reactor is added 0.2 moles of sodium acetate and 4 moles of acetic anhydride. The reactor solution will turn bright yellow almost immediately and most of the diamic acid precipitate will be dissolved in 4 hours. The reactor is allowed to stir overnight or 12 hours.

The sodium acetate is then filtered out and the filtrate is added slowly to a rapidly stirred solution of 4 moles of sodium carbonate in ice water. The product is then redissolved in acetone and the wash cycle is repeated. The wash cycle is repeated until all of the acetic acid has been removed. The product is then transferred to a wiped column high vacuum still to remove all traces of water.

Selection of the dinucleophile or B component will depend to a large degree on the nature of the A component. Where the A component is a relatively low molecular weight compound of the formula (V), higher molecular weight B component may be used in the RIM process. On the other hand, where the A reactant is a higher molecular weight prepolymer of the formula (X) or (XIV), a lower molecular weight dinucleophile will be selected.

Dinucleophiles useful in providing thermoset elastomers by RIM processing can be more particularly represented by formulas:

Where R is a hydrogen atom or a lower alkyl group (e.g., an alkyl group containing 1 to 4 carbon atoms), and W' is a polyether, aromatic or aliphatic, aliphatic polythioether, aliphatic polyetherthioether or a copolymer of aromatic and aliphatic polyethers or polythioethers which preferably do not substantially degrade upon heating to temperatures of at least 350° F. and more preferably at least 400° F. More particularly W' can be represented by the formulas (XVII)–(XIX).

$$-R^1-(-O-R^2-S-R^3-)_x- \quad \text{(XVII)}$$

$$-(-R^1-O-R^2-)_x- \quad \text{(XVIII)}$$

$$-(-R^1-S-R^2-)_x- \quad \text{(XIX)}$$

Here $R^1$, $R^2$, and $R^3$ represent straight or branched chain alkylene or arylene groups 2 to 13 carbon atoms, x is a function of the total molecular weight divided by the molecular weight of the repeating units. The total molecular weight is most generally between 500 and 6,000 and x is typically between 2 and 70. As a general rule, the dinucleophiles vary in reactivity as follows: aromatic primary amines greater than aliphatic primary amines, primary amines greater than secondary amines. Mercaptans are very slow to react. Consequently, when they are used in the RIM process, a tertiary amine such as quinuclidine or triethyldiamine is added to the A component as a catalyst. Triethylamine may also be used as a catalyst but it tends to be too volatile. All of the following dinucleophiles have been used for W'.

Representative examples of dinucleophiles are provided in the following table.

TABLE

1. 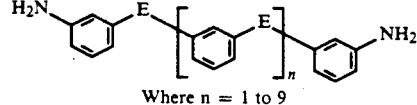

Where n = 1 to 9

2. 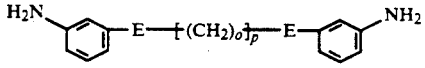

3. 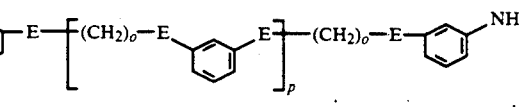

4. 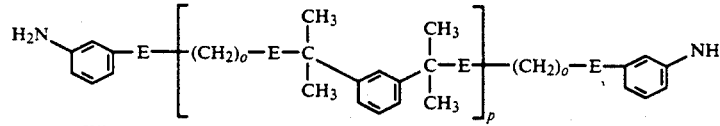

Where o = 2 to 13
   p = 1 to 9

$$E = -O-, \ -O\overset{O}{\underset{\|}{C}}-, \ -NH\overset{O}{\underset{\|}{C}}-, \ -O-\overset{O}{\underset{\|}{S}}-, \ -NH\overset{O}{\underset{\|}{S}}-$$

5. 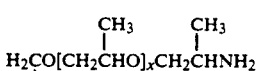

JEFFAMINE T-5000 (Texaco Corp.)
   [C.A.S. Registry No. 64852-22-8]

Were x + y + z = 27

6. $H_2NCHCH_2-[OCH_2CH]_x-NH_2$
   $\quad\ \ |\qquad\qquad\quad\ \ |$
   $\quad\ CH_3\qquad\qquad\ CH_3$ JEFFAMINE D-Series (Texaco Corp.)

| Product | x | Mol. Wt. |
   |---------|------|----------|
   | D-230 | 2–3 | 230 |
   | D-400 | 5–6 | 400 |
   | D-2000 | 33 (Avg.) | 2,000 |
   | D-4000 | 68 (Avg.) | 4,000 |

7. JEFFAMINE ED-Series (Texaco Corp.)

$H_2NCHCH_2-[OCHCH_2]_a-[OCH_2CH_2]_b-[OCH_2CH]_c-NH_2$
   $\quad\ \ |\qquad\qquad |\qquad\qquad\qquad\qquad\qquad\ \ |$
   $\quad\ CH_3\qquad\ CH_3\qquad\qquad\qquad\qquad\ CH_3$

| Product | b | a + c | Mol. Wt. |
   |---------|-------|-------|----------|
   | ED-600 | 8.5 | 2.5 | 600 |
   | ED-900 | 15.5 | 2.5 | 900 |
   | ED-2001 | 40.5 | 2.5 | 2,000 |
   | ED-4000 | 86.0 | 2.5 | 4,000 |
   | ED-6000 | 131.5 | 2.5 | 6,000 |

8. UNILINK 4200 (U. O. P. Corp.)

TABLE-continued

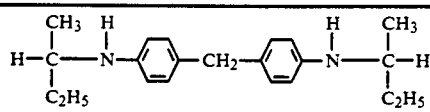

9. UNILINK 4100 (U. O. P. Corp.)

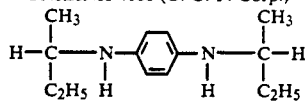

10. UNILINK XPA SERIES (U. O. P. Corp.)

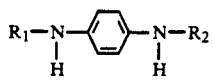

| MATERIAL CODE | $R_1$ | $R_2$ |
|---|---|---|
| XPA-23 | $C'_8$ | $C'_8$ |
| XPA-24 | $C_8$ | $C_8$ |
| XPA-28 | $C_6$ | $C_6$ |
| WHERE: | | |

$$C'_8 \text{ is } -\underset{\underset{C_2H_5}{|}}{CH}(CH_2)\underset{\underset{CH_3}{|}}{C}CH_3$$

$$C_8 \text{ is } -\underset{\underset{CH_3}{|}}{C}HC_6H_{13}$$

$$C_6 \text{ is } -\phenyl$$

11. BIS-ANILINE M (Mitsui Petrochemicals)

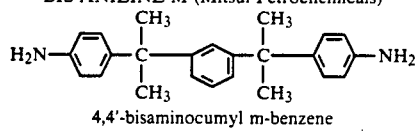

4,4'-bisaminocumyl m-benzene

12. DYTEK ™ A (Du Pont)

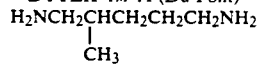

2-methylpentamethylenediamine

13. BHMT (Du Pont)
$H_2NCH_2(CH_2)_4CH_2NHCH_2(CH_2)_4CH_2NH_2$
bis-hexamethylenetriamine (BHMT)

14. $C_{12}$ DIAMINE (Du Pont)
$H_2NCH_2(CH_2)_{18}CH_2NH_2$
1,12-dodecanediamine 15. DPTA (Du Pont)
$NH_2CH_2CH_2CH_2NHCH_2CH_2CH_2NH_2$
dipropylenetriamine (DPTA)

16. TAPA (Du Pont)

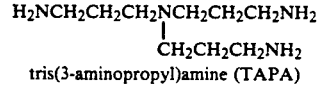

tris(3-aminopropyl)amine (TAPA)

17. TAPED (Du Pont)

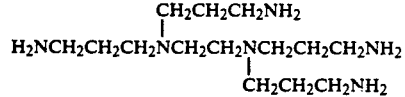

N,N,N',N'-tetrakis(3-aminopropyl)ethylenediamine (TAPED)

18. Aldrich Chemical Company
$H_2N(CH_2)_{13}-NH_2$
1,13-Tridecanediamine

19. Aldrich Chemical Company
$H_2N(CH_2)_9-NH_2$

TABLE-continued 1,9-Nonanediamine

W can also be formed from any of the polythioethers described in U.S. Pat. No. 4,366,307 to Singh et al. which is incorporated herein by reference.

These prepolymers react with dinucleophiles by a Michael Addition or Diels Alder addition to afford the elastomers, for use in RIM processes, the prepolymer must be a free flowing liquid below 250° F. Preferably, this reaction proceeds under conditions compatible with the RIM process.

Typical RIM processing conditions vary because of the differences in properties of the reactants and of the chemistry of the reactions, each material requires different processing conditions. Typical prepolymer temperatures ranged from 160° to 265° F. The higher temperatures, in excess of 230° F., were avoided whenever possible for two reasons. First of all bismaleimides, bisitaconimides, biscitraconimides, bistriazolinediones, and bisvinylketones have a tendency to react with themselves. The higher the temperature the more rapid the reaction, hence, shorter pot life. This is further aggravated by the high pumping pressure of the RIM injectors. The second reason involves the seals on the RIM machine, above 265° F. these seals begin to fail rapidly. Leaking material reduces injection pressure and upsets the stoichiometric ratio between the two components.

Mixing ratio control is important. Because the RIM process depends on a chemical reaction to achieve its finished properties, the stoichiometric ratio of the A component to the B component is important to insure that all of the reactive sites have indeed reacted and that you have achieved the maximum possible polymer networking and molecular weight. This ratio is calculated by first calculating the equivalent weights of both the A component and the B component by dividing their molecular weights by the average number of reactive sites per molecule. The actual component weight of component A in grams divided by the equivalent weight of component A equals the equivalence of component A. The equivalence of component A times the equivalent weight of component B equals the actual weight of component B expressed in grams. The actual weights of both components A and B must be converted to volumetric units before they can be set on the RIM machine. This is done by dividing the actual weights of both components by their respective specific gravities. Very small changes can have catastrophic effects on properties. For example, a 2% change in a preselected 1:1.2 volumetric RIM ratio resulted in a 22% change in flexural modulus.

All currently available metering units measure the traveling speed of the piston and calculate the displaced volume flow rate of both components. It is necessary to record and control the volumetric flow rate ratio, to insure uniform polymer performance.

RIM injection pressures ranged between 2,000 and 3,500 psi. The typical reaction time was 10 seconds, followed by an 8 hour post cure of 300° F.

The dinucleophilic B component and/or the A component may be a blend to control the RIM reaction and the properties of the elastomer which is produced. It was recognized early during our research that a blend of dinucleophiles would be needed to realize all of the property requirements for power transmission belts.

The dinucleophiles were selected on a temperature resistance and elastomeric tendency basis, i.e., a dinucleophile is selected which does not introduce thermally unstable units, but does introduce flexible elastomeric units into the polymer. Examples of dinucleophile blends (B side components) which have proved to be useful in this invention are:

| | |
|---|---|
| Jeffamine D-2000* | 60% |
| Jeffamine T-5000* | 20% |
| DuPont TAPED or TAPA** | 10% |
| Mitsui Bis-aniline M*** | 5% |
| U.O.P. UNILINK 4200**** | 5% |
| Jeffamine D-2000* | 80% |
| DuPont TAPED** | 15% |
| 1,3-bis(3-aminophenoxyl) benzene | 5% |
| Jeffamine t-5000* | 80% |
| DuPont TAPA** | 10% |
| Mitsui Bis-aniline M*** | 10% |

*A primary amine terminated aliphatic polyether available from Texaco.
**A primary amine terminated aliphatic chain available from DuPont.
***A primary aromatic diamine available from Mitsui of Japan.
****A secondary aromatic diamine available from U.O.P. Corp.

The Texaco Jeffamines are very long polyaliphaticether molecules which make up the bulk of the polymer, They are elastic, very flexible, and very soft. The D series are diamines which promote linear chain growth, were as the T series is a triamine which promotes crosslinking between chains. The crosslinkages formed by the T series Jeffamine are, however, long branched chains of about 1,800 in molecular weight. This crosslinkage does increase the resilience of the polymer but does not improve the low tear resistance of the polymer.

To improve the tear resistance, molecules such as DuPont TAPA, tris(3-aminopropyl)amine, or TAPED, N,N,N',N', -tetrakis(3-aminopropyl) ethylenediamine are introduced, these polynucleophiles with short, low molecular weight aliphatic branches produce very tight crosslinkages in a honeycomb like polymer network. It is this polymer networking that provides the resilience, tear resistance, and wear resistance to the polymer. The U.O.P. and Mitsui materials are hardness adjustors. They are short aromatic diamines with stiff para phenyl rings in their backbones.

It was also discovered that bismaleimides, bisitaconimides biscitraconimides, and bisvinylketones could also be blended to control the rate, or kinetics of the RIM reaction. It also provided a convenient means to introduce hard segments or tough segments into the polymer. Biscitraconimides react slower than bismaleimides and bisitaconimides with dinucleophiles and impart a resilience to the polymer because of its pendant methyl group. Bisvinylketones react much more rapidly with dinucleophiles than bismaleimides or bisitaconimides and provide a means to increase the rate of reaction and reduce the post cure time and temperature. Bisvinylketone linkages are not ring structures, therefore they are more flexible than the bismaleimide, biscitraconimide, or bisitaconimide structures. The bisacetalketones on the other hand are tetra-functional and produce a very tight crosslinkage network. They harden and stiffen the polymer considerably. Examples of the most useful bismaleimide, biscitraconimide, bisitaconimides, bisacetalketones, bistriazolinedione, and bisvinylketones used are:
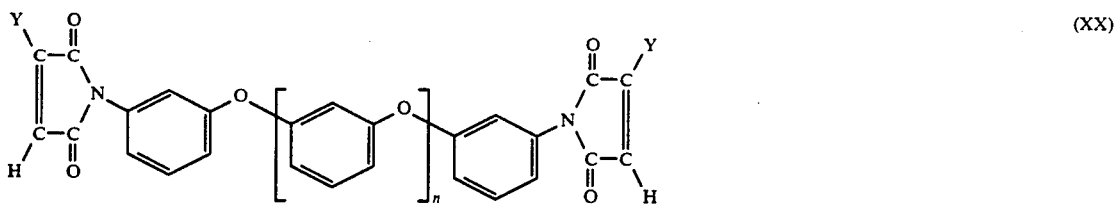
(XX)
Where: n = 1 to 5
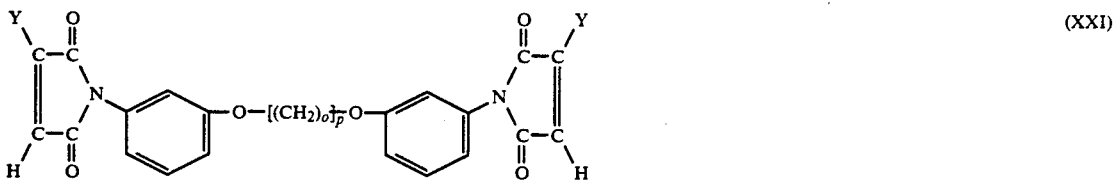
(XXI)
Where: o = 6 and 13
p = 1, 3, and 5
y = H or methyl group
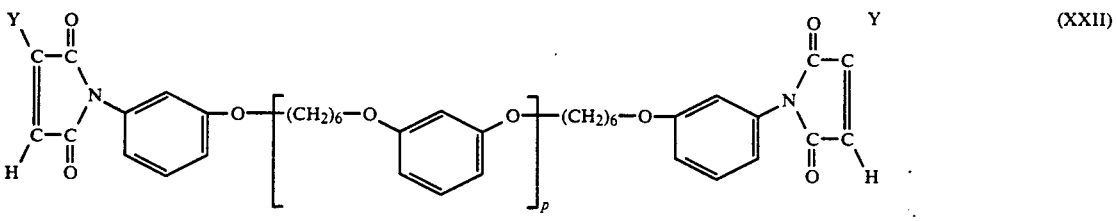
(XXII)
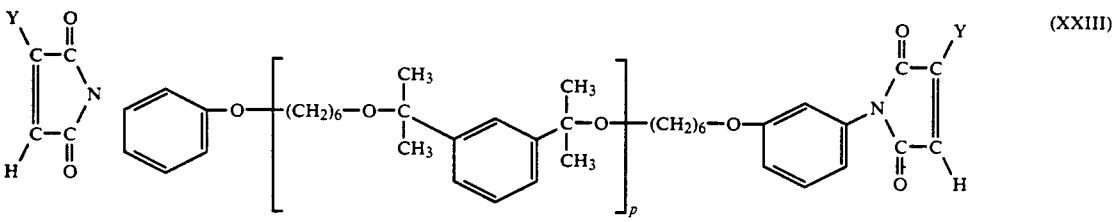
(XXIII)
Where: p = 3 or 5
(XXIV)
Where: o = 6 or 9
p = 1, 3, or 5
(XXV)
N,N',-bismaleimidodiphenyl methane
(Hetrimide 5250 from Ciba Giegy Corp.)
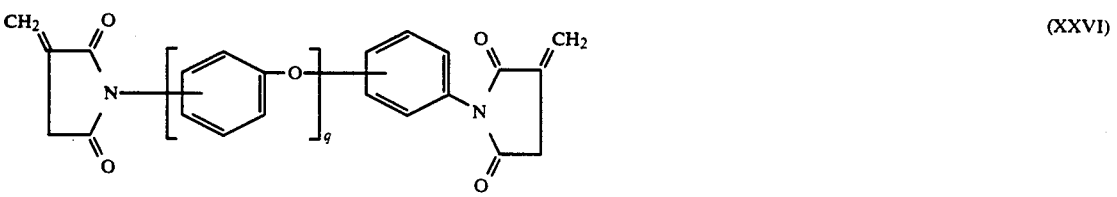
(XXVI)
Where: q = 1 through 7.

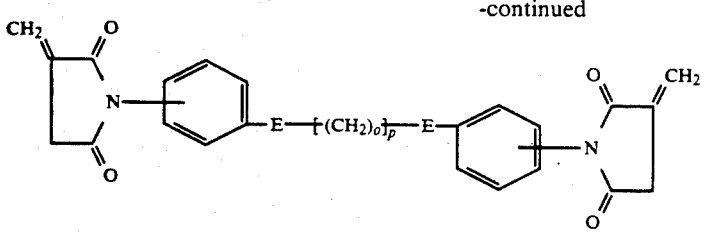

(XXVII)

Where: E = —O—, —O—C(=O)—, —N(H)—C(=O)—, —O—S(=O)—, —N(H)—S(=O)— o = 4, 5, 6, 8, 9, 12, or 13
p = 1, 3, or 5

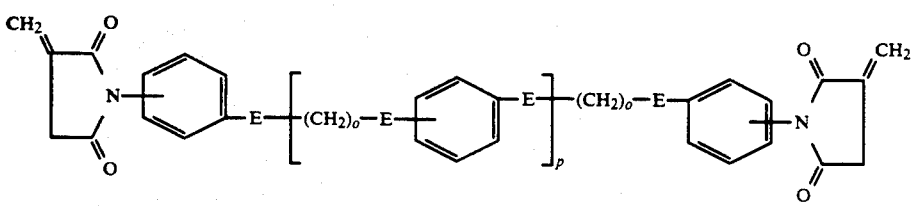

(XXVIII)

Where: E = —O—, —O—C(=O)—, —N(H)—C(=O)—, —O—S(=O)—, —N(H)—S(=O)— o = 4 through 13
p = 3 or 5

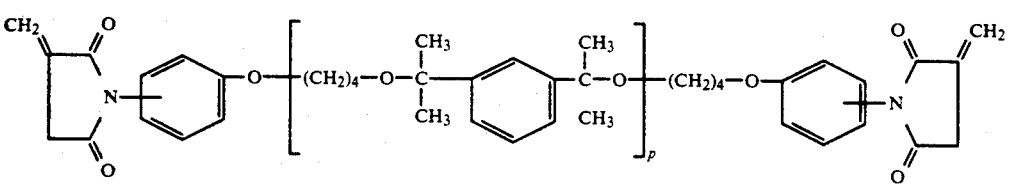

(XXIX)

Where: p = 3 or 5

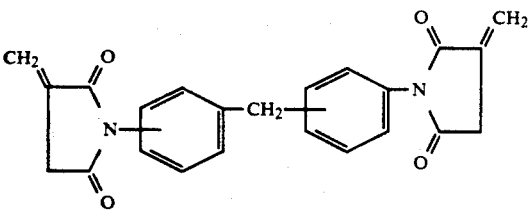

(XXX)

A second approach to designing component A is to end cap a high temperature resistance, secondary amine or mercaptan terminated, liquid prepolymer with a low molecular weight bisitaconimide. The theory being that the end capping groups, although high melting solids, are so small compared to the body of the molecule that they have little effect on the melting point of the total molecule. This proved to be true. The bismaleimides or bisitaconimides represented by formula (X) or (XII-A) and more specifically by formula (XXV), (XXVI) or (XXVII) above are examples of the end capping bisitaconimides or bismaleimides used.

A number of liquid A components of the general formula (XI) were made from mercaptan terminated polythioethers and polyoxythioethers from Products Research & Chemical Corporation by the following method.

PROCEDURE: A solution containing 1.0 mole equivalent of mercaptan terminated prepolymer, and 1 ml. of triethylamine in dry dimethylformamide (DMF) was added drop wise to a mechanically stirred solution of a bisitaconimide BII with the general formula (XII-A) or more specifically formula (XXVI) or (XXVII) (2.1 mole equivalent) in dry DMF containing 10% of m-cresol, at 60° C. The mixture was stirred at that temperature for 24 hours, then poured into a 10 to 1 solution of methanol and acetic acid with vigorous stirring. The mixture of solvents were decanted and the viscous polymer product was washed three times with methanol, then dried under reduced pressure. The bisitaconimide end capped prepolymer then could be reacted with low molecular dinucleophiles such as Dupont DYTEK A (2-methylpentamethylenediamine) blended with TAPA (tris(3-aminopropyl)amine) and/or TAPED (N,N,N',N',-tetrakis(3-aminopropyl)ethylenediamine). Examples of Products Research & Chemical Corporation prepolymer blends are:

| | |
|---|---|
| RW-2063-70 | 80% |
| RW-2064-70 | 20% |
| RW-2064-70 | 80% |
| RW-2065-70 | 20% |

RW-2063-70 is a mercaptan terminated polyoxythioether prepolymer with an average molecular weight of 6,500 and an average functionality of 2.75.
RW-2064-70 has the same general structure as RW-2063-70 differing only in the molecular weight 2,850 and the functionality 2.0.
RW-2065-70 is a short chain dimercaptan with a molecular weight of 154.3, functionality of 2.0, and the formula HSCH$_2$CH$_2$SCH$_2$CH$_2$SH.

Typical nucleophiles (B components) used to produce elastomers by reaction with A components prepared by endcapping liquid prepolymers were piperazine, 2-methylpiperazine, methylene dianiline, DuPont DPTA (dipropylenetriamine), TAPA (tris(3-aminopropyl)amine), TAPED (N,N,N',N',-tetrakis(3-aminopropyl)-ethylenediamine), Cis-diaminocyclohexane and 1,12-dodecanediamine and 1,13-tridecanediamine. This second method was used considerably during the early polymer evaluation studies because it was something we could do quickly to obtain polymer samples.

Another useful class of dinucleophiles is biscyclopentadienyl alkanes and, more particularly cyclopentadienyl alkanes having 1 to 15 carbon atoms in the alkylene bridge between the cyclopentadienyl rings. The preparation of these compounds is illustrated in

GENERAL PROCEDURE FOR THE PREPARATION OF BISCYCLOPENTADIENYL ALKANES

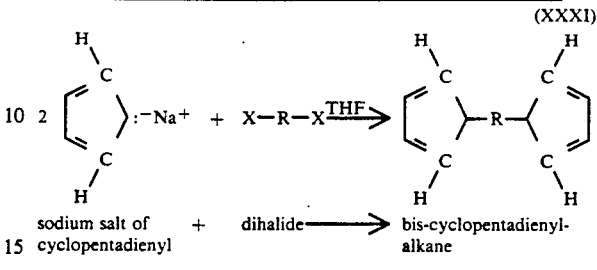

Where x = Cl, Br, or I preferably Bromine

These compounds react with bismaleimide, bisitaconimide, biscitraconimide, and bistriazolinedione terminated prepolymers in a Diels Alder addition with the formation of a polynorbornene elastomer. The basic reduction scheme is shown below.

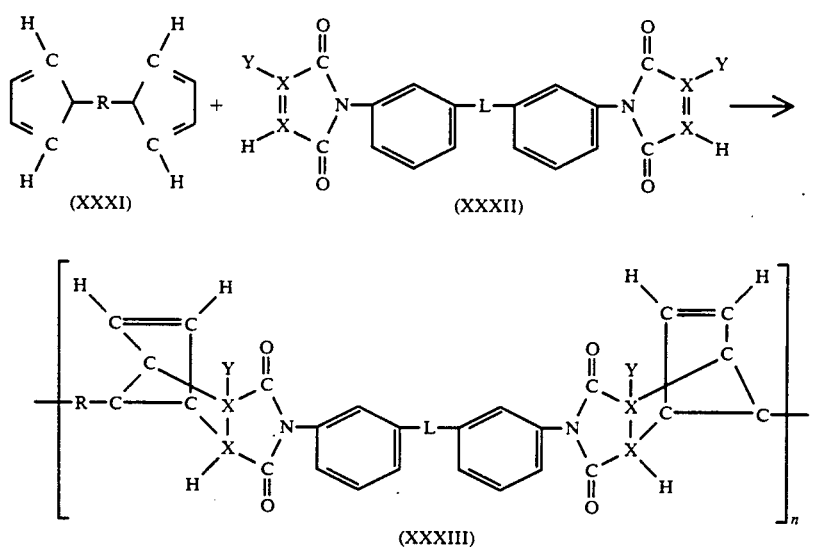

The prepolymers of the present invention can also be reacted with biscyclopentadienones to produce a RIM processable polyhydrophthalimide. This reaction is shown below.

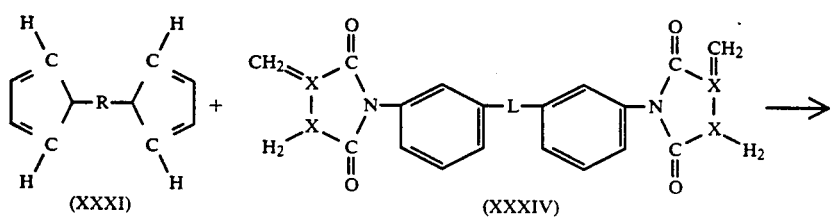

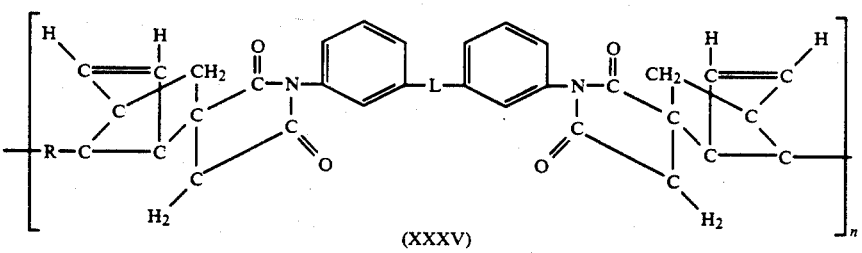
(XXXV)
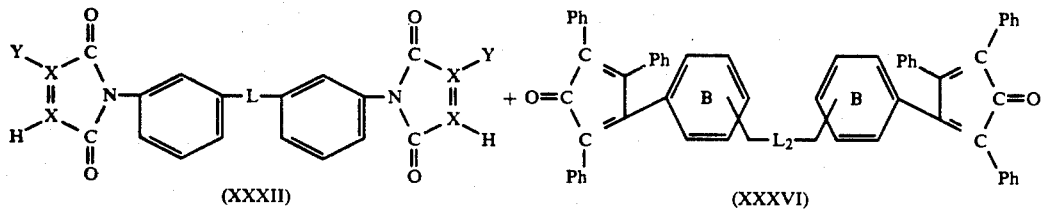
(XXXII)      (XXXVI)
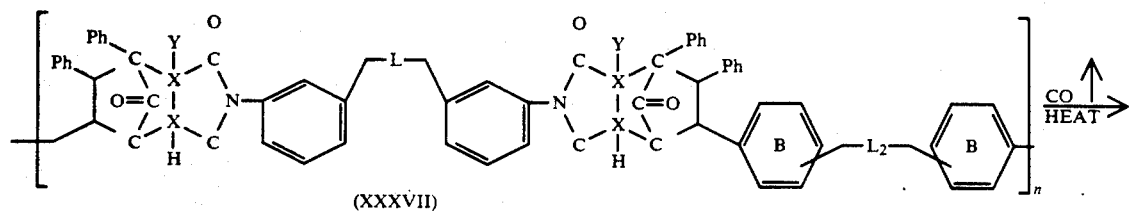
(XXXVII)
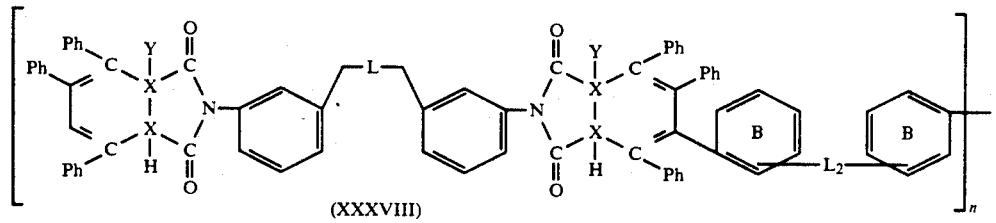
(XXXVIII)
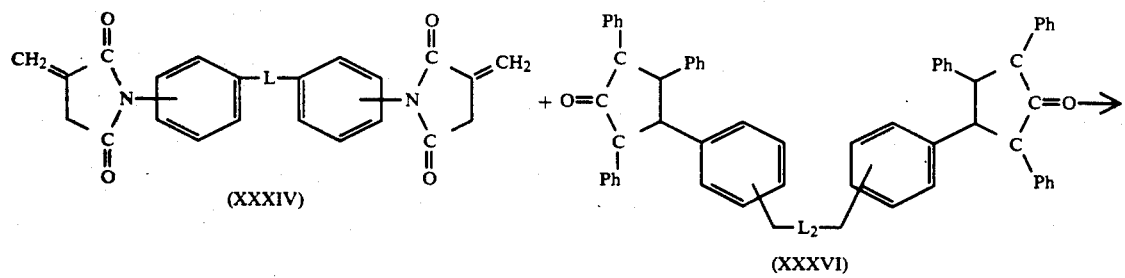
(XXXIV)      (XXXVI)
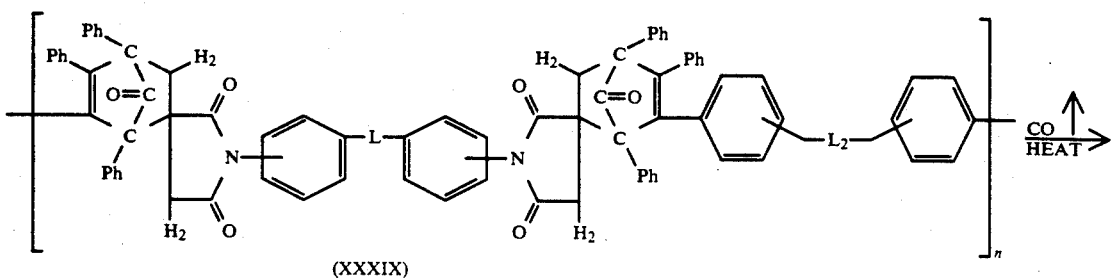
(XXXIX)

-continued

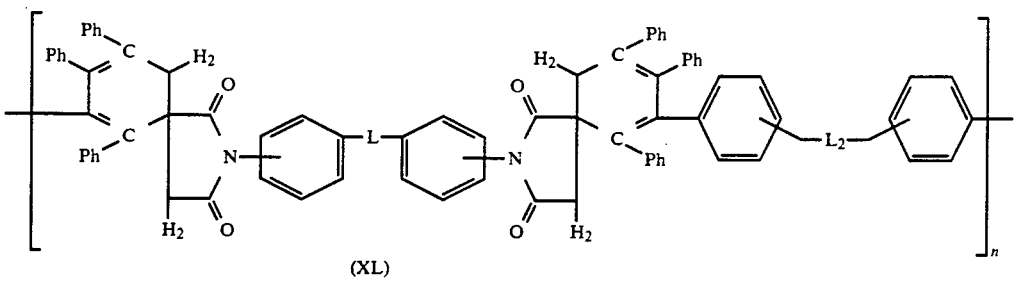

(XL)

Note: The $L_2$ groups can be attached to the phenyl rings, B and B', in para or meta position, preferably in meta position.
Where: Ph = phenyl $C_6H_5$
L = represents a flexible linking group having one of the following structures.

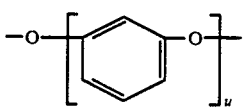

Where u is 1 to 7 and preferably 1, 3, or 7 and t is 1 to 5 and preferably 1 or 3, and g = 4 through 13

The linking group L is usually divalent, however, trivalent and tetravalent linking groups such as

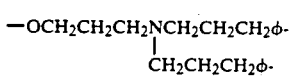
tris(3-etherpropyl)amine

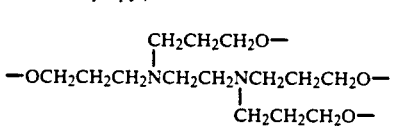

N,N',N',-tetrakis(3-etherpropyl)ethylenediamine are also possible.

This reaction is desirable because it proceeds with the loss of carbon monoxide which makes the reaction irreversible.

Compounds of the formula (XXXVII) can be prepared as illustrated in synthesis Example 5.

For use in power transmission belts, the elastomers of the present invention must have the tensile, resiliency, solvent resistance and flexural characteristics which provide good service life as well as high temperature resistance. Elastomers which are particularly preferred in these applications have the following properties.

| Tensile (kpsi) | 1.5 to 3.5 |
| Elongation (%) | 150 to 300 |
| Flexural Modulus (kpsi) | 10.0 to 30.0 |
| Shore hardness | 75A to 45D |
| Degradation temp. (in air) | > = 600° F. |

RIM is the reaction of two highly reactive components insitu in a mold. In accordance with the present invention, the bismaleimide, bisitaconimide, biscitraconimide, bistriazolinedione, or bisvinylketone and the dinucleophile are impingement mixed and injected into a mold in a conventional manner where they react to form the thermally stable elastomers of the present invention.

The invention is illustrated in more detail by way of the following non-limiting examples.

SYNTHESIS EXAMPLE 1

Endcapping of Dimercaptans

Dimercaptiodiethylsulifide (7.7 gr. or 0.1 mole equivalence) containing a few drops of triethylamine was added drop wise to a solution of (42.5 gr. or 0.22 mole equivalence) of N,N',-bisitaconimidodiphenyl methane, in 500 ml. of freshly distilled m-cresol. The mixture was stirred at room temperature for 2 hours, then warmed to 60° C. A solution of (303.7 gr. or 0.213 mole equivalence) of RW-2064-70, a mercaptan terminated polythioether prepolymer available from Products Research & Chemical Corp., in 500 ml. m-cresol was added slowly to the mixture and the resulting mixture was mechanically stirred for 20 to 24 hours at 60° to 70° C., then for an additional 2 hours 100° C. The mixture was cooled to 80° C. and (40.5 gr. or 0.21 mole equivalence) of bisitaconimidodiphenyl was added, then stirred overnight. The resulting mixture was poured into a solution of methanol containing 10% acetic acid in a stainless steel Waring blender and the viscous polymeric material was broken to form a resinous liquid polymer, separated in a separatory funnel from the methanol, the prepolymer was washed three times with methanol, and dried in a rotoevaporator under vacuum at 60° C. for 3 hours.

SYNTHESIS EXAMPLE 2

Endcapping of Dimercaptans

A solution of 0.1 mole equivalent of mercaptan terminated liquid polymer RW-2066-70, available from Products Research & Chemical Corp., in 1 liter dry DMF was added dropwise to a mechanically stirred solution of 4,4-bisitaconimidocumyl metabenzene, available from Mitsui Petrochemicals Corp., (2.0 mole equiv.) in dry DMF, containing 10% of m-cresol and 1 ml. of triethylamine, at 60° C. The mixture was stirred at that temperature for 24 hours, then poured into a 10 to 1 solution of methanol and acetic acid with vigorous stirring. The solvents were decanted from the viscous prepolymer product and washed three times with methanol, then dried in a rotoevaporator under vacuum at 60° C. for 4 hours.

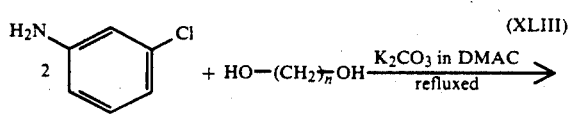

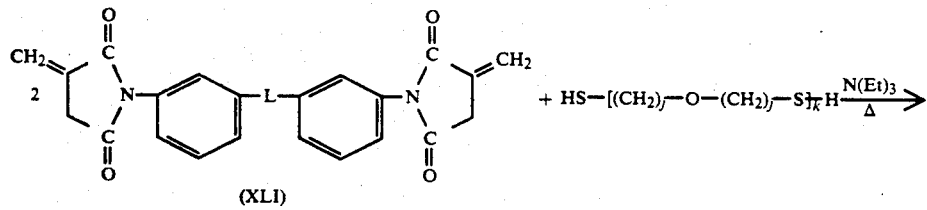

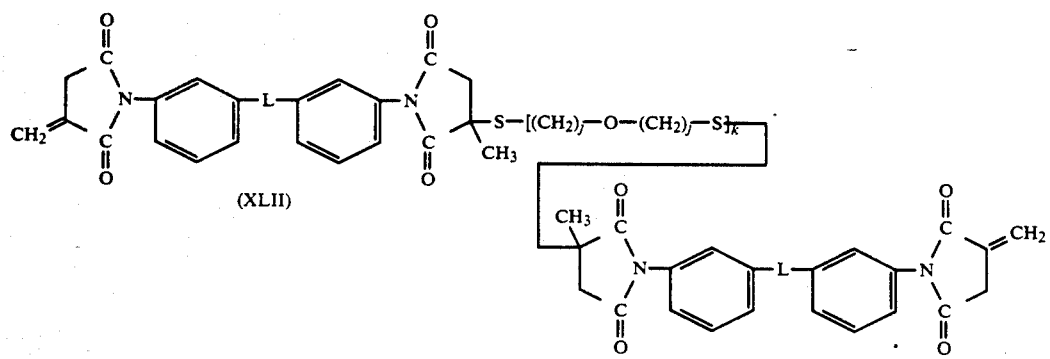

Where: j = 1, 2, 3, 4 and sometimes 6
k = 38 to 91

The resulting bisitaconimide end capped prepolymer was reacted with various diamines such as DuPont $C_{12}$ DIAMINE, 1, 12-dodecanediamine, or DuPont TAPA, tris(3-aminopropyl)amine, or 2-methyl piperazine to yield amorphous dark brown to light amber thermoset plastic resins.

SYNTHESIS EXAMPLE 3

Preparation of Polyether Diamines

In a 500 ml. round bottom three neck flask outfitted with a refluxing condenser, mechanical stirrer, and addition separatory funnel was added 150 ml. DMAC, 15.19 gr. of potassium carbonate, and 32.18 gr. of meta chloroaniline. This mixture was stirred and heated to 150° C. After the mixture had a chance to stabilize at 150° C. for 30 minutes 12.43 gr. of hexanediol was added drop wise to the flask over a 1 hour period. The flask was allowed to reflux overnight or 18 hours. The flask was then allowed to cool down to room temperature. The contents were filtered and the solid potassium carbonate was discarded. The filtrate was then mixed with water and 100 ml. of chloroform. The chloroform diamine layer was washed with water 4 times. The organic layer was then distilled under vacuum. The chloroform and water fractions were discarded, the last fraction was saved. The reaction yield was 83.0% of 6,6'-diamino m-phenoxyhexane. This nucleophilic aromatic substitution reaction was used to make a variety of aromatic amines and aromatic amine terminated aliphatic ether diamines.

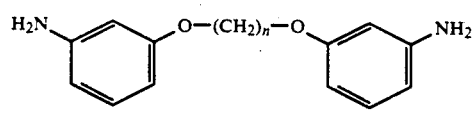

Where n = 4 to 13

SYNTHESIS EXAMPLE 4

Preparation of Liquid Bisamleimides

To a vigorously stirred solution of 6,6'-diamino m-phenoxyhexane (0.1 mole) in acetone under a nitrogen atmosphere, maleic anhydride (.22 mole) was added, the temperature outside being maintained at a constant 20° C. The pale yellow solid of bis-maleamic acid soon obtained on addition of maleic anhydride, was vigorously stirred for a further 0.5 hour to complete the reaction. To the continuously stirred suspension of compound in acetone were added acetic anhydride (70 ml., excess) and fused sodium acetate (5 to 6 gr.), and the acetone was allowed to reflux. Refluxing and stirring were continued until the solution became clear (2 to 2.5 hours).

The clear brownish yellow solution was poured into ice water and 100 ml. of chloroform was added and the whole thing was shaken in a separatory funnel. The organic layer was washed with water containing sodium bicarbonate 4 times by shaking it in a separatory funnel. The organic layer was then passed through a filtration chromatography column containing silica gel. The chloroform was then removed by distillation under vacuum in a rotoevaporator. The resulting 6,6'-bismaleimido m-phenoxyhexane is a yellowish orange viscous liquid at room temperature.

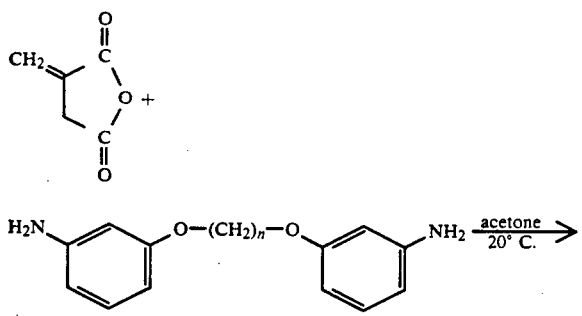

(XLIV)

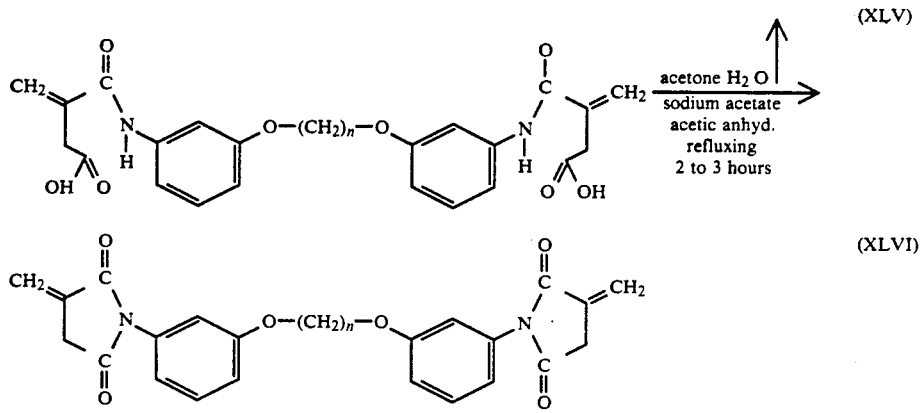

(XLV)

(XLVI)

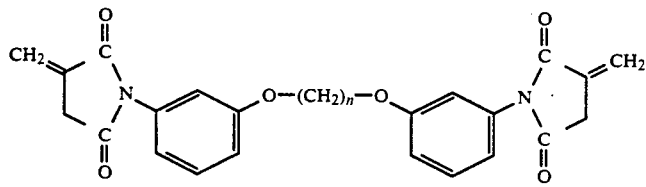

where n = 4 to 13

SYNTHESIS EXAMPLE 5

Preparation of the Biscyclopentadiene

A mixture of meta-dibromobenzene (1 mole), triphenyl phosphine (20 gr.), copper iodide (3 qr.), and palladium (II) acetate (1 gr.), in 1 liter of dry triethylamine is heated and stirred at 100° C. Phenylacetylene (2.5 moles), is added slowly and the resulting mixture is refluxed for 8 hours. The mixture is cooled and the solid product washed with ether, then with water, and methanol. The product I, is then air-dried and used in the next step.

(XLVII)

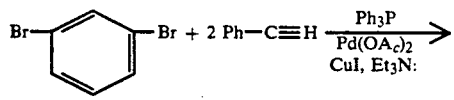

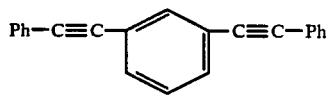

Step 2

A mixture of potassium permanganate (3 mole), 1,4-bis(phenylethynyl)arene, product I (1 mole), water (6 liters), methylene chloride (5 liters), acetic acid (400 ml.), and phase transfer agent (Adogen 464 methyltrialkyl ($C_8$-$C_{10}$)-ammonium chloride available from Aldrich Chemical Co.) is mechanically stirred and refluxed for 6 hours. After cooling, sodium-hydrogen sulfite (20 gr.) is added slowly to reduce any unreacted permangante. After 15 minutes the solution is acidified with 1 liter of concentrated hydrochloric acid and the precipitated manganese dioxide is reduced by addition of excess concentrated sodium hydrogen sulfite solution. The aqueous phase is separated and extracted with dichloromethane (3 liters). The combined organic layer is washed with 5% sodium hydroxide solution, dried magnesium sulfate, filtered, and concentrated to give the product II.

(XLVIII)

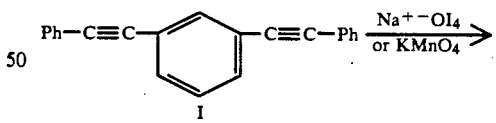

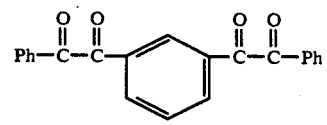

Step 3

A one mole equivalent sample of product II and two mole equivalent of dibenzylketone is heated for 4 hours in a mechanically stirred dichlorobenzene solution. The mixture is diluted with addition of hexane and the solid product is filtered, washed with hexane and dried. Purification of this product may be carried out by recrystallization from acetone or methyl ethyl ketone.

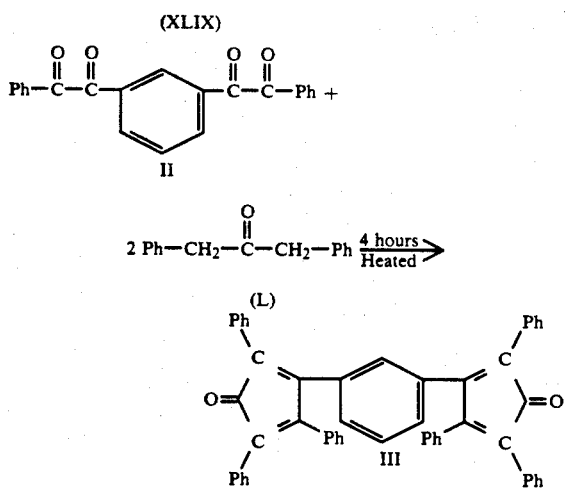

Where: Ph = phenyl rings

SYNTHESIS EXAMPLE 6

Preparation of Biscyclopentadienyl Alkane

To a solution of sodium cyclopentadienyl (2 mole equivalence), in dry tetrahydrofuran (THF) under nitrogen atmosphere and ice bath temperature, is added drop wise a solution of 1,6-dibromohexane, selected from those with the general form shown below, (1 mole equivalence), in dry THF. When the addition is complete, the mixture is stirred at 5° to 10° C. for 6 to 12 hours. The resulting solution is poured into an ice-cold dilute hydrochloric acid (5%) and the product is isolated by filtration or extraction.

GENERAL PROCEDURE FOR THE PREPARATION OF BISCYCLOPENTADIENYL ALKANES

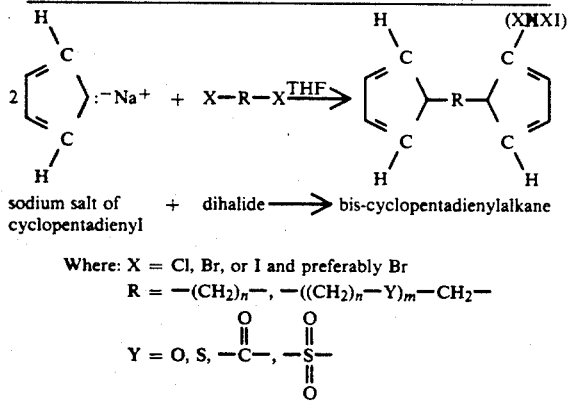

sodium salt of + dihalide ⟶ bis-cyclopentadienylalkane
cyclopentadienyl

Where: X = Cl, Br, or I and preferably Br $R = -(CH_2)_n-, -((CH_2)_n-Y)_m-CH_2-$ $Y = O, S, -\overset{O}{\underset{\parallel}{C}}-, -\overset{O}{\underset{\underset{O}{\parallel}}{\overset{\parallel}{S}}}-$ Where: n = 1 to 15
m = 1 to 6

SYNTHESIS EXAMPLE 7

Preparation of Activated Bisvinylketone

To a solution of suberoyl chloride. ClCO(CH$_2$)$_6$ COCl, (1 mole equivalence) and aluminum chloride (2.2 mole equivalence) in methylene chloride at 0° C., is added drop wise a solution of trimethylvinyl silane (2.4 mole equivalence) in methylene chloride. The mixture is stirred at 0° to 5° C. for 6 to 10 hours, then poured in ice-cold 10% hydrochloric acid. The mixture is shaken in a separatory funnel, methylene chloride layer is washed with water, dried (MgSO$_4$). The solution is then filtered and the methylene chloride is distilled under vacuum in a rotoevaporator at 50° C. to give bisvinylketone product.

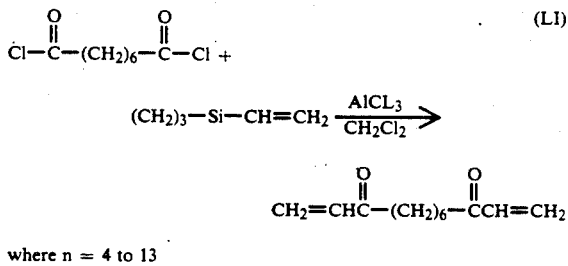

where n = 4 to 13

SYNTHESIS EXAMPLE 8

Preparation of Liquid Bisitaconimides
Specifically BII P250)

The Polamine 250 contains a lot of water. It must be dried before using. This is accomplished by placing the open can in a vacuum oven over night, set at 100° C. and 1 mm of H$_g$. Care must be taken to apply the vacuum only after the material has arrived at temperature and then very slowly to prevent the material from foaming over.

The acetone is also dried before using. This is accomplished by stirring 1 lb. of Drierite, (W.A. Hammond Drierite Co.), in 10 liters of acetone sealed in a 12 liter flask over night The acetone is then redistilled and stored in wax sealed septum bottles.

All glassware is dried in a hot air oven set at 120° C. over night. The glassware is assembled hot, sealed, and purged with dry Argon gas before it has a chance to cool down.

Given

Polamine 250, molecular weight=474, functionality=2.
Itaconic Anhydride, molecular=112
Acetic Anhydride, molecular weight=102.09
Sodium Acetate, molecular weight=82.03

Computations 250 grams of Polamine 250/474=0.5274 moles of Polamine
112·0.5274·2=118.14 grams of Itaconic anhydride
118.14·1.1=129.95 grams, 10% extra Itaconic anhydride

Preparation of the Diamic acid

The polamine 250 is Preheated to 70° C. and weighed directly into the bottom of a hot, Predried, 5 liter, 3 neck (24/40 joints), fluted side, reactor flask. The flask is quickly assembled, sealed, and purged down with dry Argon gas. After the flask and diamine has cooled down to 40° C., 2,250 ml. of dried acetone is added and the flask is slowly stirred until all of the Polamine 250 has dissolved.

Weigh the maleic anhydride in a Predried, glass stoppered, 500 ml. Erlenmeyer flask. Add a magnetic stirring bar and 400 ml. of predried acetone. Stir the mixture until the itaconic anhydride has dissolved. Pour the solution into a predried 500 ml dropping, pressure equalizing, funnel mounted on the reactor setup. Rinse out the Erlenmeyer flask with an additional 50 ml. of dried acetone and add it to the dropping funnel.

Chill the reactor down to 12° C. and start the addition of the Itaconic anhydride-acetone solution drop wise to the reactor. During the addition step the reactor is stirred vigorously but not to the point of splattering. Nearly immediately the reactor solution will turn yellow, and after 10 to 20 minutes, depending on the rate of addition, a creamy yellowish precipitate will start to form.

Care must be taken during this step, if too little acetone is used the reactor can setup hard and break.

After the addition is complete, about 3 to 4 hours, the ice water bath is removed and the reactor is allowed to warm up naturally to room temperature, about 23° C. The addition funnel is rinsed with 50 ml. of dried acetone and this $ allowed to slowly drip into the reactor. The reaction is allowed to continue over night, about 12 hours. Morning the next day the reactor will contain a creamy off white colored slurry, very thick.

Longer reaction time will not hurt the product.

Ring Closing Conditions

The conditions for closing the amic acid structure to form the Itaconimide ring is very important to both temperature and the proportions of sodium acetate and acetic anhydride used. For best results use 0.2 moles of sodium acetate, and 2 moles of acetic anhydride per mole of the amic acid group. The reactor temperature should not be allowed to rise above 27° C. at any time. For best results reactor temperatures should be controlled between 23° and 27° C. The reaction time is also a concern, typically overnight or 12 hours is sufficient to complete the reaction. It can be allowed to continue longer if desired, but should be a bright yellow, if there is even the slightest hint of amber or brown to the mixture the reactor has overheated or the reaction has gone too long. The product contains impurities and may not be stable.

Computations

2·0.2·0.5274·82.03 = 17.305 grams of sodium acetate
2·2·0.5274·102.37 = 215.37 grams of acetic anhydride

Preparation of the BII

Both the sodium acetate and the acetic acid are added directly to the reactor.

Care is taken to get all of the materials into the reactor and not to leave any clinging to the sides.

The addition funnel is removed and the reactor is stoppered with a glass thermometer adapter stopper and a 10° to 100° C. thermometer. Within 20 minutes the creamy (off white colored) precipitate will start to dissolve and the reactor contents will take on a bright yellow color. The reactor should be stirred vigorously to break up lumps and to facilitate in dissolving the precipitate. After 12 hours the contents of the reactor will be a very intense bright yellow, almost clear, with sodium acetate crystals and some crystallized BII in the Bottom.

Workup of the BII

The contents of the reactor are first vacuum filter through a coarse glass fretted Büchner funnel. The sodium acetate left in the funnel is washed with fresh acetone to dissolve any BII that is trapped in the salt. The filtrate is again vacuum filtered through a fine glass fretted Büchner funnel. The salt remaining in the funnel is again washed with fresh acetone The filtrate is then slowly added to five liters of a cold, 10° to 20° C., solution of sodium carbonate in distilled water, 105.99·4·0.5274 = 223.6 grams of sodium carbonate per 5 liters of water. Care must be taken that the solution does not foam over.

After all of the filtrate has been added and the effervescing has ceased, the stirring is stopped and the solution is allowed to settle. The aqueous layer is decanted and discarded. The crude BII is redissolved in to 1 liter of fresh acetone and the wash cycle is repeated once again with a dilute solution of sodium carbonate in distilled water.

The BII is again redissolved in 1 liter of acetone and washed in just distilled water. This step may be repeated two or more times until there is not even a hint of acetic acid left.

The BII is then redissolved in 500 ml. of acetone and transfered to a rotary evaporator flask. The flask is then placed on a rotary evaporator and heated to 80° C. and the flask is evacuated to a pressure of 1 mm of Hg. This process is carried out for 10 to 12 hours. The flask is then attached to a Kügelrohr still, the temperature is maintained at 80° C. but the pressure is lowered to 0.02 mm Hg. The BII is distilled for an additional 10 to 12 hours. The flask is then purged with $N_2$ stoppered with a glass stopper and labeled.

The resulting BII will be a light golden yellow to a light amber yellow colored, syrupy liquid Which may in time partially crystallize. The approximate values for SP. Gr. = 1.172 grams/cubic centimeter, molecular weight = 638, and functionality = 2. It also becomes very fluid at 65° C.

Having described the invention in detail and by reference to specific embodiments thereof, it will be apparent that numerous modifications are possible without departing from the spirit of the invention as defined in the following claims.

What is claimed is:

1. A prepolymer of the formula:

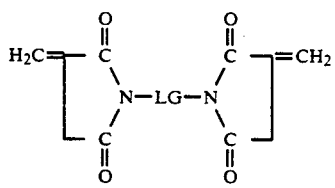

where LG is a linking group.

2. The prepolymer of claim 1 wherein LG is represented by the formula:

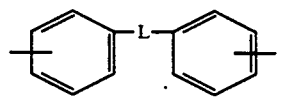

where L represents a flexible linking group.

3. The prepolymer of claim 2 wherein L is selected from the group consisting of

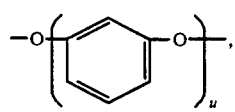

-continued

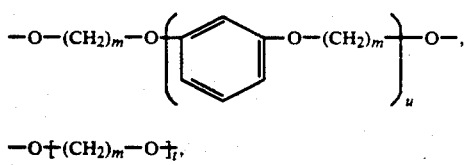

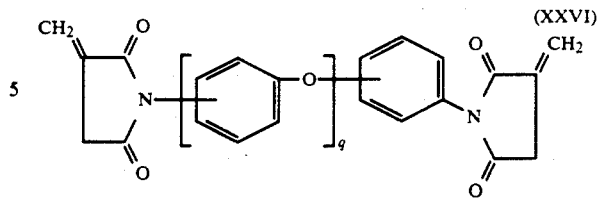

where q is 1 through 7;

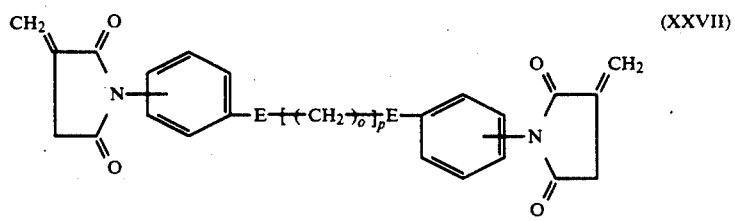

where E is —O—,

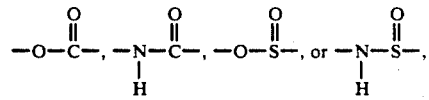

o is 4, 5, 6, 8, 9, 12, or 13 and p is 1, 3, or 5;

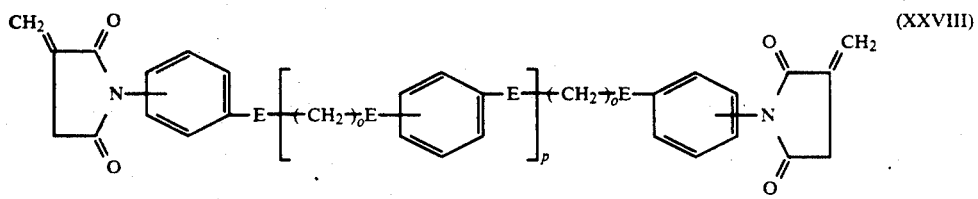

where E, o, and p are defined as in formula (XXVII),

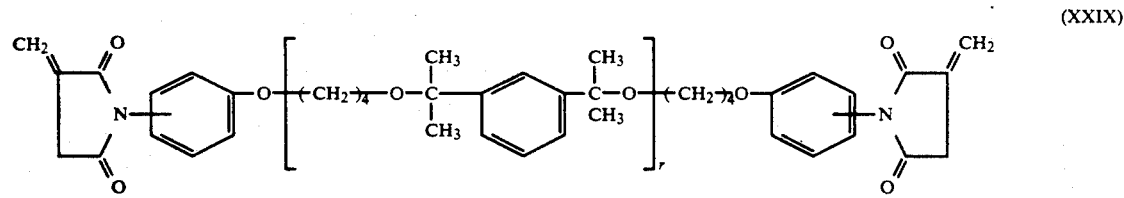

where r is 3 or 5, and

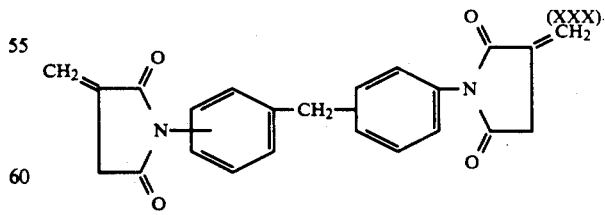

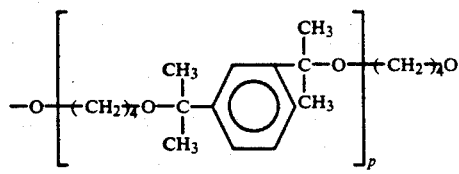

where E is —O—,

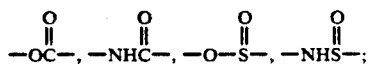

u is 1 to 7; t is 1 to 5; m is 1 to 12; p is 3 or 5; and Ar represents an arylene group.

4. The prepolymer of claim 3 wherein said prepolymer is selected from the group consisting of 5. In a process for reaction injection molding, the improvement which comprises reacting a dinucleophile the formula (XV) or (XVI)

$$H-S-W-S-H \qquad (XV)$$

-continued

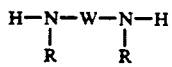 (XVI)

where R is a hydrogen atom or a lower alkyl group and W' is a polyether, aromatic or aliphatic, aliphatic polythioether, aliphatic polyetherthioether or a co-polymer of aromatic and aliphatic polyethers or polythioethers with a prepolymer of the formula

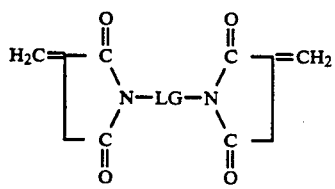

where LG is a linking group.

6. The process of claim 5 wherein LG is represented by the formula:

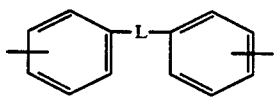

where L represents a flexible linking group.

7. The process of claim 6 wherein L is selected from the group consisting of

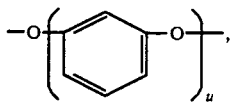

$-O-(CH_2)_m-O-\left[\phantom{X}\right]-O-(CH_2)_m-O-\bigg\}_u$, $-O-[(CH_2)_m-O-]_t$, an alkylene bridge of 1 to 5 carbon atoms,

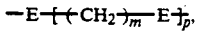

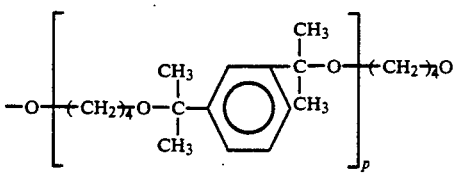

where E is —O—,

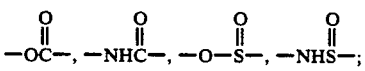

u is 1 to 7, t is 1 to 5, m is 1 to 12, p is 3 or 5; and Ar represents an arylene group.

8. The process of claim 7 wherein said prepolymer is selected from the group consisting of

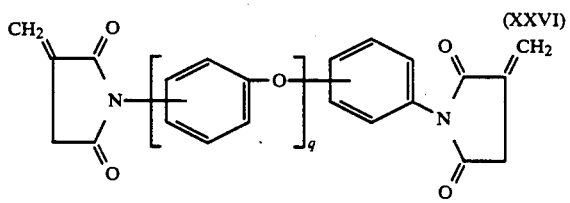 (XXVI)

where q is 1 through 7,

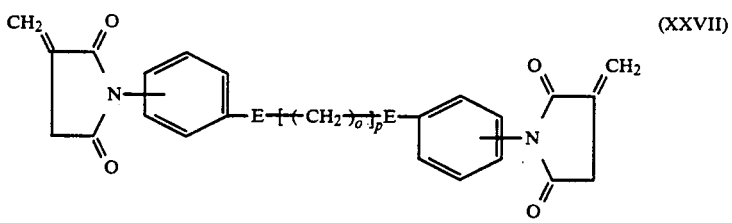 (XXVII)

where E is —O—,

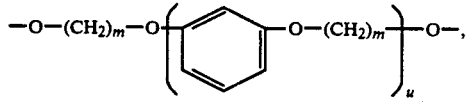

o is 4, 5, 6, 8, 9, 12, or 13 p is 1, 3, or 5,

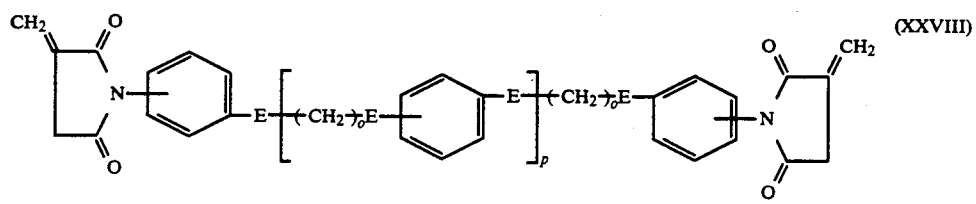 (XXVIII)

where E, o and p are defined as in formula XXVII,

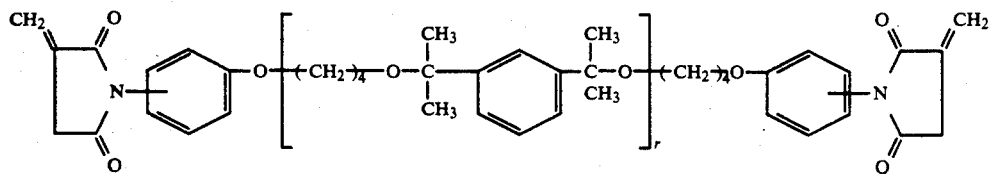

where r is 3 or 5,

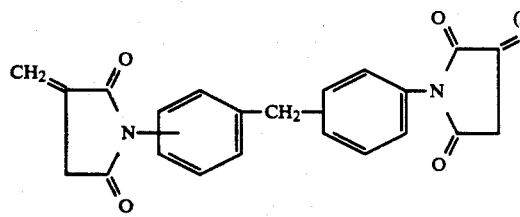

9. The process of claim 5 wherein W' is represented by the formulas (XVII)–(XIX)

$$-R^1-(-O-R^2-S-R^3-)_x-  \quad \text{(XVII)}$$
$$-(-R^1-O-R^2-)_x-  \quad \text{(XVIII)}$$
$$-(-R^1-S-R^2-)_x-  \quad \text{(XIX)}$$

where $R^1$, $R^2$ and $R^3$ represent straight or branched chain alkylene or arylene groups having 2 to 12 carbon atoms and x is 2 to 70.

10. A polymer obtained by reacting a prepolymer as defined by the formula

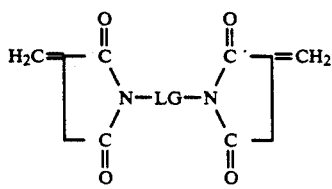

where LG is a linking group, and copolymers thereof with a dinucleophile

11. The polymer of claim 10 wherein said polymer is a copolymer of said prepolymer with a dinucleophile.

* * * * *